US008756244B2

(12) United States Patent
Raichura

(10) Patent No.: US 8,756,244 B2
(45) Date of Patent: Jun. 17, 2014

(54) METADATA AS COMMENTS FOR SEARCH PROBLEM DETERMINATION AND ANALYSIS

(75) Inventor: Ray Raichura, Cary, NC (US)

(73) Assignee: Teradata US, Inc., Dayton, OH (US)

(*) Notice: Subject to any disclaimer, the term of this patent is extended or adjusted under 35 U.S.C. 154(b) by 352 days.

(21) Appl. No.: 12/648,508

(22) Filed: Dec. 29, 2009

(65) Prior Publication Data

US 2011/0029539 A1   Feb. 3, 2011

Related U.S. Application Data

(60) Provisional application No. 61/229,402, filed on Jul. 29, 2009.

(51) Int. Cl.
  *G06F 7/00* (2006.01)
  *G06F 17/30* (2006.01)

(52) U.S. Cl.
  USPC .......................................... 707/759; 707/803

(58) Field of Classification Search
  USPC ........................................ 707/708, 607, 759
  See application file for complete search history.

(56) References Cited

U.S. PATENT DOCUMENTS

| 5,551,027 | A  | * | 8/1996 | Choy et al. .............................. 1/1 |
| 6,487,552 | B1 | * | 11/2002 | Lei et al. ................................ 1/1 |
| 6,546,388 | B1 |   | 4/2003 | Edlund et al. |
| 6,718,324 | B2 |   | 4/2004 | Edlund et al. |
| 6,839,700 | B2 | * | 1/2005 | Doyle et al. .................. 707/719 |
| 2003/0120654 | A1 |   | 6/2003 | Edlund et al. |
| 2004/0068489 | A1 | * | 4/2004 | Dettinger et al. ................. 707/3 |
| 2005/0091198 | A1 | * | 4/2005 | Dettinger et al. ................. 707/3 |
| 2005/0223030 | A1 | * | 10/2005 | Morris et al. ............... 707/104.1 |
| 2006/0026013 | A1 | * | 2/2006 | Kraft ............................... 705/1 |
| 2006/0041547 | A1 | * | 2/2006 | Karch ............................... 707/5 |
| 2008/0215543 | A1 |   | 9/2008 | Huang et al. |
| 2009/0112981 | A1 | * | 4/2009 | Markovich ..................... 709/203 |
| 2011/0040733 | A1 | * | 2/2011 | Sercinoglu et al. ........... 707/688 |

OTHER PUBLICATIONS

Owens, Michael. "The Definitive Guide to SQLite". 2006. Apress. pp. 366.*

* cited by examiner

*Primary Examiner* — James E Richardson
(74) *Attorney, Agent, or Firm* — Schwegman, Lundberg & Woessner, P.A.

(57) ABSTRACT

Techniques for using metadata as comments to assist with search problem determination and analysis are provided. Before an action is taken on a search, contextual information is gathered as metadata about the action and actor requesting the action. The metadata is embedded in the search as comments and the comments are subsequently logged when the action is performed on the search. The comments combine with other comments previously recorded to permit subsequent analysis on searches.

16 Claims, 3 Drawing Sheets

METADATA AS COMMENTS FOR SEARCH PROBLEM DETERMINATION AND ANALYSIS

RELATED APPLICATION

This application is co-pending with and includes the same inventor as pending Provisional Application No. 61/229,402 filed on Jul. 29, 2009 and entitled: "Metadata as Comments for Problem Determination;" and the present application is a non-provisional of that Provisional Application and claims priority thereto and incorporates by reference the entirety of that Provisional Application herein.

BACKGROUND

One of the major reasons why applications exhibit poor performance is due to runaway queries. If Hibernate or other Object Relation Mapping (ORM) framework is not mapped correctly, it can produce a behavior known as N+1 Select where in a many-to-one relationship the one row in the table generates many (N) unnecessary Select statements.

Thus, improved mechanisms for identifying poor performing queries are needed.

SUMMARY

In various embodiments, techniques for using metadata as comments for search problem determination and analysis are presented. According to an embodiment, a method for using metadata with search queries for analysis is provided. Specifically, An action against a search query is detected. Contextual information is gathered for the search query in response to the action. The contextual information is retained as metadata that is carried as comments with the search query when the action is performed on the search query.

DETAILED DESCRIPTION

Figure 1:
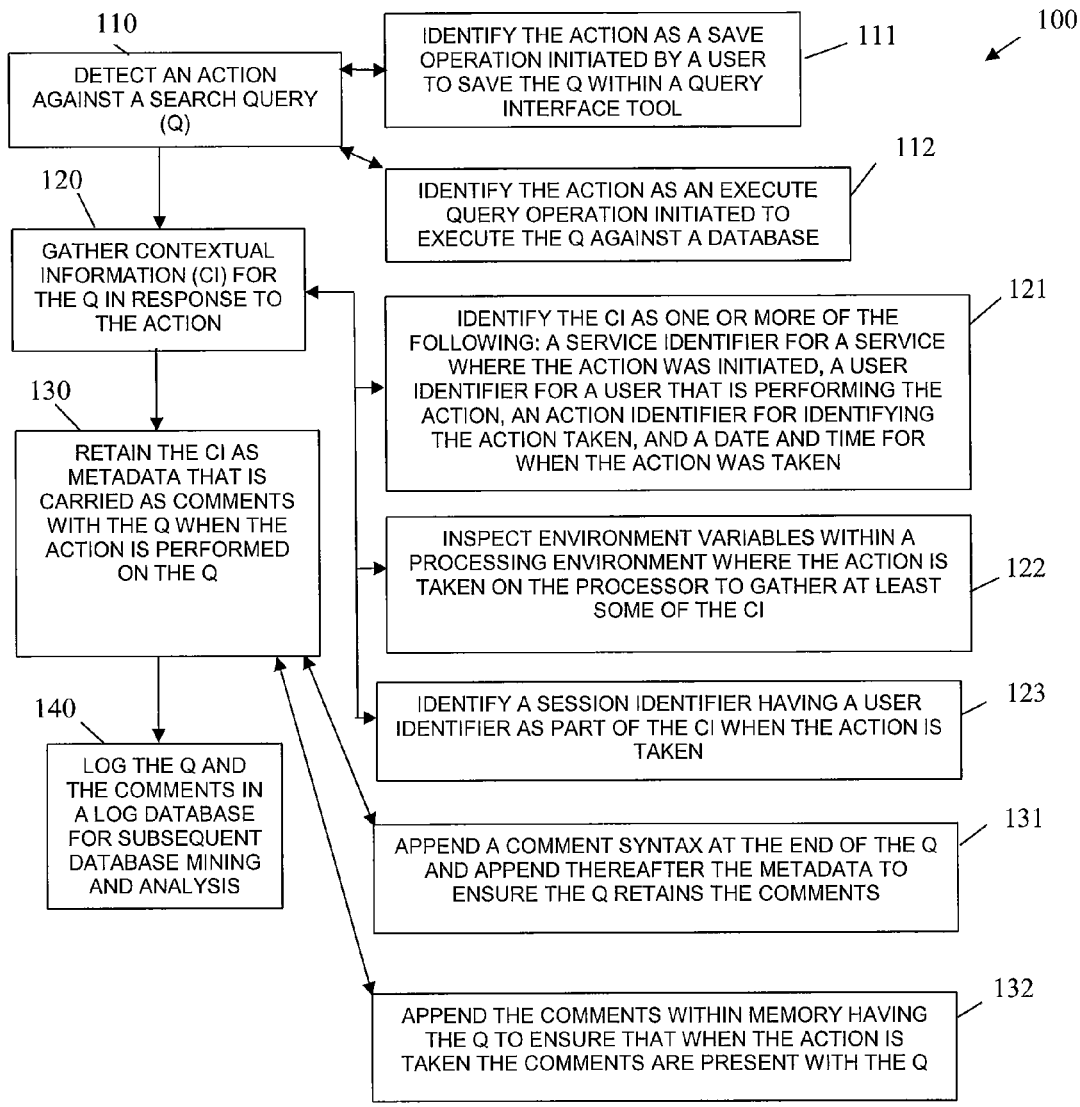
FIG. 1 is a diagram of a method for using metadata with search queries for analysis, according to an example embodiment.

FIG. 1 is a diagram of another method 100 for using metadata with search queries for analysis, according to an example embodiment. The method 100 (hereinafter "query analysis service") is implemented as instructions within a computer-readable storage medium that execute on one or more processors, the processors are specifically configured to execute the query analysis service. The query analysis service is operational over a network; the network is wired, wireless, or a combination of wired and wireless.

In an embodiment, the search query language is structured query language (SQL). It is noted that the teachings presented herein are not so limited to any particular query language and others can be used. SQL is presented for purposes of illustration and comprehension and other query languages can be used as well.

At 110, the query analysis service detects an action against a search query. Actions can include a variety of processing, such as a save operation and query execute operation, and the like.

According to an embodiment, at 111, the query analysis service identifies the action as a save operation that a user initiates to save the search query within a query interface tool.

In another case, at 112, the query analysis service identifies the action as an execute query operation initiated to execute the query against a database.

It is also noted that the actor performing the action does not have to be a user. That is, some actors can be automated applications that other indirect actions performed by a user can cause to be initiated. So, the action may be associated with an automated actor.

At 120, the query analysis service gathers contextual information for the query in response to the action. Contextual information can include a variety of types of information that is automatically gathered by the query analysis service.

For example, at 121, the query analysis service identifies the contextual information as one or more of the following: a server identifier for a service where the action was initiated (such as query interface tool, customer relationship manager (CRM) tool, and the like); a user identifier for a user that is performing the action (this can be an actor identifier for automated actors as discussed above); an action identifier for identifying the action being taken (save, execute, and the like); and/or date and time information for when the action was taken.

In another case, at 122, the query analysis service inspects environmental variables within a processing environment where the actions are taken on the processor to gather at least some of the contextual information. That is, environmental settings for the processing environment can be interrogated by the query analysis service to gather some of the contextual information.

In yet another situation, at 123, the query analysis service identifies a session identifier having the user identifier for a user as part of the contextual information when the action is taken. So, a communication session established between the user and a search tool can be interrogated to acquire details about the session and used as part of the automated contextual information obtained by the query analysis service.

At 130, the query analysis service retains the contextual information as metadata that is then carried as comments within the search query when the action is subsequently performed on the query. That is, the metadata (contextual information) is appended to the search query as a comment that the query language ignores and carries with the search query.

So, according to an embodiment, at 131, the query analysis service appends a comment syntax recognized by the query language of the search query at the end of the search query. Following the comment syntax, the query analysis service appends the metadata to ensure that the subsequent action taken on the search query retains the comments but does not interfere with processing the action in a normal manner.

In another situation, at 132, the query analysis service appends the comments within memory having the query to ensure that when the action is taken the comments are present with the query. An example of doing this is provided below within the context of a JAVA® Thread Object. Here, should the query be submitted as an execute operation, the comment can be appending in memory with that call to ensure the comment is present when the query is executed.

At 140, the query analysis service logs the search query and the comment in a log database for subsequent database mining and analysis. That is, the comment and other previous comments can be indexed and stored in multiple database tables and subsequently evaluated via normal database mining operations to identify problems with particular queries, problems with queries particular users execute, and the like.

Figure 2:
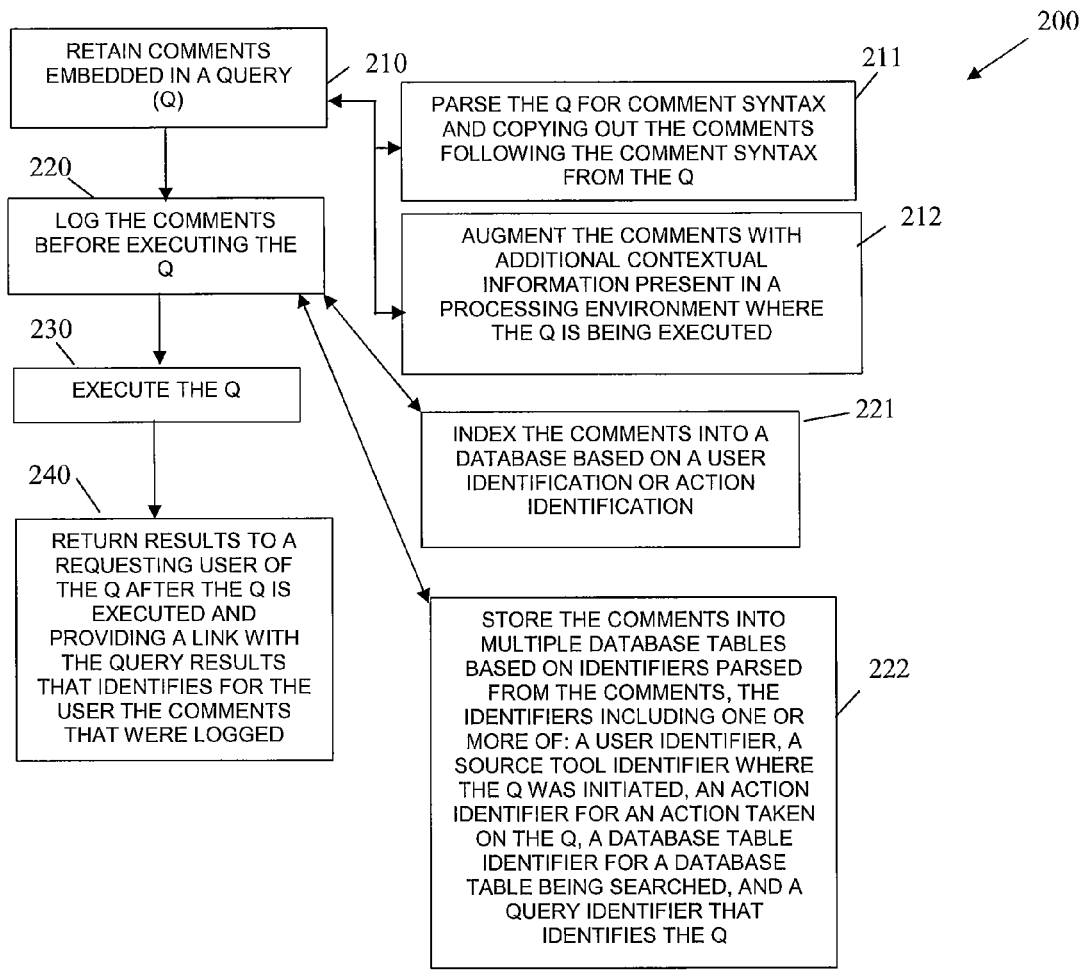
FIG. 2 is a diagram of another method for using metadata with search queries for analysis, according to an example embodiment.

FIG. 2 is a diagram of another method 200 for using metadata with search queries for analysis, according to an example embodiment. The method 200 (hereinafter "metadata service") is implemented as instruction within a computer-readable storage medium that execute on a plurality of processors, the processors specifically configured to execute the metadata service. The metadata service is operational over a network; the network is wired, wireless, or a combination of wired and wireless.

The metadata service represents processing occurring when a search query having an existing comment is executed. The processing discussed above with respect to the method 100 of the FIG. 1 represents processing that occurs when the comments are initially gathered and carried with a search query.

At 210, the metadata service retains comments that are embedded within a query. So, comment syntax that can be carried in a query language with a query and that are typically ignored by the service executing a query are detected and stripped and retained by the metadata service.

According to an embodiment, at 211, the metadata service parses the query for comment syntax and copies out the comments following the comment syntax from the query. This is a mechanism for initially recognizing the presence of the comments and retaining them.

In yet another scenario, at 212, the metadata service augments the original comments with additional contextual information present in a processing environment where the query is being executed. Here, where the comments were originally carried with the query may be an entirely different environment from where the query is actually executed. So, the metadata service can gather additional details that may be relevant to the processing environment of where the query is being executed, such as processor load of the processor, other services processing, and the like.

At 220, the metadata service logs the comments (and any additional dynamically gathered contextual information at run time of the query) for subsequent analysis and data mining.

In an embodiment, at 221, the metadata service indexes the comments into a database table based on user identification or user action. So, the relevant information in the comments are capable of being mined and analyzed in view of a particular user or a particular action being taken on the query.

In a related situation, at 222, the metadata service stores the comments into multiple database tables based on identifiers parsed from the comments. This permits multiple associations or relationships to be associated with the query and the comments. The identifiers can include a variety of information, such as but not limited to, a user identifier, a source tool identifier where the query was initiated, an action identifier for an action taken on the query, a database table identifier for a database table being searched using the query, and/or a query identifier that uniquely identifies the query.

In an embodiment, at 240, the metadata service returns results to a requesting user of the query after the query is executed and provides a link with the query results that identifies for the user the comments that were logged. So, the users can see the metadata captured as comments.

Figure 3:
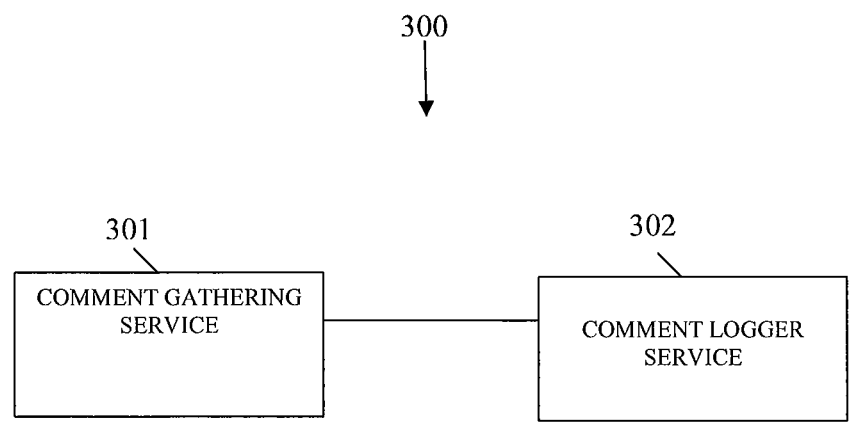
FIG. 3 is a diagram of a metadata search query analysis system, according to an example embodiment.

FIG. 3 is a diagram of a metadata search query analysis system 300, according to an example embodiment. The metadata search query analysis system 300 is implemented within and resides within a computer-readable storage medium and executes on one or more processors specifically configured to execute the components of the metadata search query analysis system 300. Moreover, the metadata search query analysis system 300 is operational over a network and the network is wired, wireless, or a combination of wired and wireless.

The metadata search query analysis system 300 implements, inter alia, the method 100 of the FIG. 1 and the method 200 of the FIG. 2.

The metadata search query analysis system 300 includes a comment gathering service 301 and a comment logger service 302. Each of these and their interactions with one another will now be discussed in turn.

The comment gathering service 301 is implemented in a computer-readable storage medium and executes on a processor. Example aspects of the comment gathering service 301 were provided in detail above with reference to the method 100 of the FIG. 1.

The comment gathering service 301 is configured to collect contextual information when an action is initiated on a search query and configured to add the contextual information as metadata represented via comments of the search query.

In an embodiment, the comment gathering service 301 is also configured to identify types of contextual information to collect based on policy that is dynamically evaluated and used to configure the comment gathering service 301 for initial processing.

In yet another case, the comment gathering service 301 is configured to pass the search query to a search query processor to perform user-directed actions on the search query once the metadata is acquired and integrated as the comments into the search query.

The comment logger service 302 is implemented in a computer-readable storage medium and executes on a processor. Example aspects of the comment logger service 302 were provided above in detail with reference to the methods 100 and 200 of the FIGS. 1 and 2, respectively.

The comment logger service 302 is configured to strip the comments from the search query when the search query is executed against a database and log the comments for subsequent analysis.

According to an embodiment, the comment logger service 302 is configured to store the comments in multiple database tables based on information parsed from the comments.

In another situation, the comment logger service 302 is configured to gather additional contextual information to augment the comments. The additional contextual information also logged with the comments. This scenario was discussed above with reference to the method 200 of the FIG. 2.

Some sample scenarios and illustrations are now presented for further comprehension of the invention. These are not intended to limit the teachings presented herein to any particular implementation or scenario.

SQL comments are made use of to add query metadata that accompanies the query, for example:
select*from Orders-- userId:Ray
Raichura,time:1225205869734,dispatch:editObjectFrom-
Finder,ver:06.00.02. 03,url: trm/finderChooseExisting.do, thread:http-sor25;

All characters after the "--" comment marker are ignored but retained by the SQL parser. The full SQL statement is sent to the database for execution and is also logged by a Database Query Logger or Log Script (DBQL).

A DBQL provides a series of predefined tables that can store historical records of queries and their duration, performance, and target activity. DBQL caches and eventually stores query information in multiple Data Dictionary tables as the queries are executed.

Consider a few entries for Queries with comments in a DBQL as follows:

1) Select t, "Update_DTTM",t,"MESSAGE_ID",t,"Update_USER" from ex-message as t where MESSAGE_ID='TMSGA0000050'—url:/trm/communication.do,ver:6.0,3.0,83349.branches/stable/dispatch:ajaxSubmitEntity,usi d:jack 2) Select t, "Update_DTTM",t,"STEP ID",t,"Update_USER" from ex-step as t where STEP ID='BBBBWNWNBBBX'—url:/trm/communication.do, ver:6.0,3.0,83349.branches/stable/dispatch:ajaxSubmitEntity,use rid:perf The metadata information is captured at the very beginning of a user action i.e. Clicking Save. The information is stored in Java's ThreadLocal object which allows transportation of data within the same thread. At the end of the user action and right before the query is sent to the database for execution, the data stored in ThreadLocal object is retrieved and appended to the query as comments.

One way to figure out the submitter of a query is by looking at Username column in DQBL. This lists the name of the logged-in user under whom the query was issued. Unfortunately this is not always accurate as Connection Pooling defeats it. Connection Pooling opens up multiple connections to the database (at application start-up) under one generic user. So DBQL will show that all queries were issued by this one generic user.

The solution allows one to map each query to a user and their activities. Without the appended metadata as comments, there is no way to accurately determine the origination of a query. In addition, macros group the data by user, screen, and action. From these macros, one is able to figure out:

How many queries were issued by the user during a certain time period.

How many queries were issued by a certain action such as clicking Save.

Number of queries issued by screen showing usage pattern.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a computer-readable storage medium and processed by a processor to perform the method, comprising:

detecting, via the processor, an action against a search query;

gathering, via the processor, contextual information for the search query in response to the action and identifying the contextual information as: a service identifier for a service where the action was initiated, a user identifier for a user that is performing the action, an action identifier for identifying the action to be taken, and a date and time for when the action was detected;

augmenting, via the processor, the contextual information with additional contextual information present in a processing environment where the search query is to be executed, the additional contextual information including details relevant to the processing environment including a processor load for a processor and identifications for other services processing when the query is to be executed;

retaining, via the processor, the contextual information with the additional contextual information as metadata that is carried as comments with the search query when the action is performed on the search query and the comments are ignored by a search service that executes the search query and the comments are retained by a Structured Query Language (SQL) parser, and storing the comments to a database and executing the action.

2. The method of claim 1, wherein detecting further includes identifying the action as a save operation initiated by the user to save the search query within a query interface tool.

3. The method of claim 1, wherein detecting further includes identifying the action as an execute query operation initiated to execute the search query against the database.

4. The method of claim 1, wherein gathering further includes inspecting environment variables within the processing environment where the action is taken on the processor to gather at least some of the contextual information.

5. The method of claim 1, wherein gathering further includes identifying a session identifier having the user identifier as part of the contextual information when the action is taken.

6. The method of claim 1, wherein retaining further includes appending a comment syntax at the end of the search query and appending thereafter the metadata to ensure the search query retains the comments.

7. The method of claim 1, wherein retaining further includes appending the comments within memory having the search query to ensure that when the action is taken the comments are present with the search query.

8. The method of claim 1 further comprising, logging, via the processor, the search query and the comments in a log database for subsequent database mining and analysis.

9. A method implemented in a computer-readable storage medium and processed by a processor to perform the method, comprising:

retaining, via the processor, comments embedded in a query and augmenting the comments with additional contextual information present in a processing environment where the query is being executed, the additional contextual information including details relevant to the processing environment including a processor load for a processor and identifications for other services processing when the query is executed;

logging, via the processor, the comments before executing the query, and storing the comments into multiple database tables of a database based on identifiers parsed from the comments, the identifiers including: a user identifier for a requesting user that initiated the query, a source tool identifier where the query was initiated, an action identifier for an action taken on the query, a database table identifier for the database table being searched when the query is executed, and a query identifier that identifies the query; and executing, via the processor, the query, the query executed by a search service that ignores the comments and the comments are retained by a Structured Query Language (SQL) parser; and storing the comments the database.

10. The method of claim 9, wherein retaining further includes parsing the query for comment syntax and copying out the comments following the comment syntax from the query.

11. The method of claim 9, wherein logging further includes indexing the comments into the database based on the user identifier or the action identifier.

12. The method of claim 9 further comprising, returning, via the processor, results to the requesting user of the query after the query is executed and providing a link with the query results that identifies for the requesting user the comments that were logged.

13. A processor-implemented system, comprising:
- a processor having memory, the memory configured with a comment gathering service that executes on the processor; and
- the memory also configured with a comment logger service that executes on the processor;
- the comment gathering service is configured to collect contextual information when an action is initiated on a search query and configured to add the contextual information as metadata represented in comments of the search query, the contextual information includes a service identifier for a service where the action was initiated, a user identifier for a user that is performing the action, an action identifier for identifying the action to be taken, and a date and time for when the action was detected, and the comment logger service is configured to strip the comments from the search query when the search query is executed against a database and log the comments for subsequent analysis by using the user service identifier, the user identifier, and the action identifier, and the comment logger service further configured to augment the comments with additional contextual information present in a processing environment where the search query is being executed, the additional contextual information including details relevant to the processing environment including a processor load for a processor and identifications for other services processing when the query is executed, and the comments ignored by a search service that executes the search query and the comments are retained by a Structured Query Language (SQL) parser and stored in a database.

14. The system of claim 13, wherein the comment gathering service is further configured to identify types of contextual information to collect based on a policy that is evaluated and used to configure the comment gathering service.

15. The system of claim 13, wherein the comment gathering service is configured to pass the search query to a search query processor to perform a user-directed action on the search query once the metadata is acquired and integrated as the comments into the search query.

16. The system of claim 13, wherein the comment logger service is configured to store the comments in multiple database tables based on information parsed from the comments.

* * * * *